Patented Oct. 10, 1944

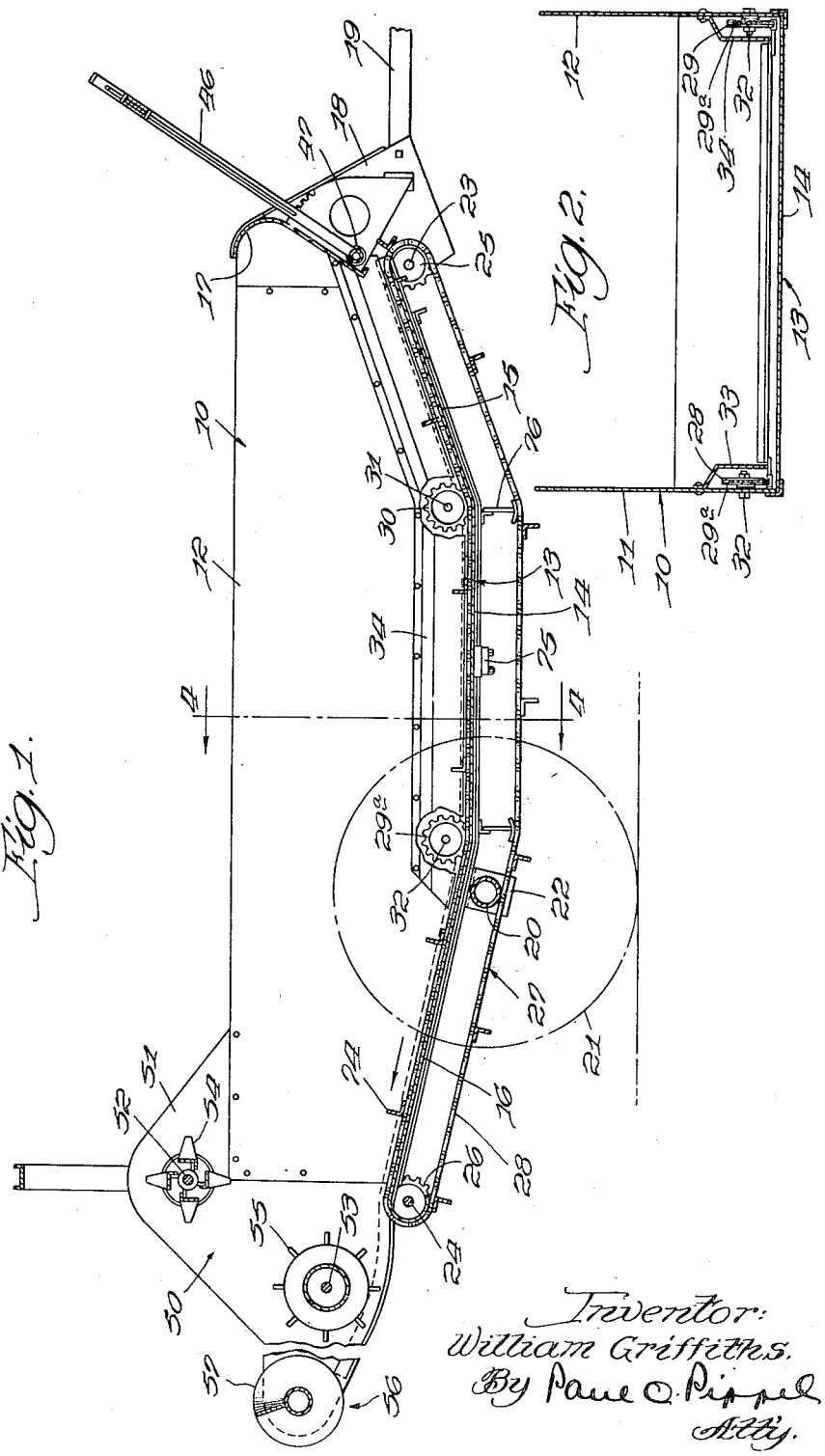

2,360,126

UNITED STATES PATENT OFFICE 2,360,126

METHOD OF SPREADING MANURE

William Griffiths, Black Creek, Wis.

Original application July 23, 1942, Serial No. 452,043. Divided and this application August 9, 1943, Serial No. 497,943

2 Claims. (Cl. 275—5)

This invention relates to a method of spreading fertilizer. More particularly, it relates to a method of spreading a natural fertilizer, such as manure, and is a division of my present application on "Fertilizer spreader," Serial No. 452,043, filed July 23, 1942.

Heretofore, manure or other fertilizers have only been spread in a solid form inasmuch as agriculturalists and manufacturers had not appreciated the advantages possible from the combined use of liquid fertilizer with the solid fertilizer, with the result that large quantities of natural liquid portions of manure were constantly wasted.

The principal object of the present invention is to provide a method of handling manure preliminary to spreading as a fertilizer.

Other and further important objects of this invention will become apparent from the following detailed description and accompanying drawing, in which:

Figure 1 is a sectional view of a form of spreader construction, embodying the method of fertilizer distributor of this invention; and Figure 2 is a sectional view taken on the line 2—2 of Figure 1.

In order to more adequately describe the principles of the method of spreading manure, the following description will show the application to a spreader machine.

The spreader includes a main body, generally indicated at 10, including a pair of transversely spaced, vertical side sheets 11 and 12, and a bottom 13. As best shown in Figure 1, the bottom includes a depending, intermediate floor section 14 and a pair of oppositely, upwardly sloping floor sections 15 and 16. As will be hereinafter more fully described, the bottom 13 is liquid tight and has liquid-tight connection with the side sheets 11 and 12.

The front floor section 15 slopes upwardly toward the front end of the spreader body 10 and is associated with a front wall portion 17 extending transversely across the bottom. The wall 17 is formed as part of a front end structure that includes a pair of plate members 18, spaced transversely apart and respectively associated with the side sheets 11 and 12. The front end structure further includes a forwardly extending draft or hitch means 19, which may be suitably connected to a tractor or other source of draft power.

The rear end of the spreader body 10 is suitably carried on a transverse axle 20 and a pair of wheels 21. The axle 20 is appropriately secured by brackets 22 to the under portion of the body 10.

As will be seen from the description thus far, the body 10 differs from the usual spreader body in that it has a depending, intermediate, liquid-tight portion, the side sheets 11 and 12, and the floor 13 combining to provide a liquid-tight, hopper-like body having an intermediate portion disposed at a level below the opposite end portions. This construction enables the body 10 to contain a supply of both solid and liquid fertilizer. This fertilizer is preferably discharged at the rear of the body 10 in a manner which will presently be described.

The transversely spaced side plates 18 at the front of the body journal therebetween a transverse shaft 23. The rear end of the body carries a parallel shaft 24. These shafts respectively carry transversely spaced drive elements in the form of sprockets 25 and 26. These sprockets carry a discharge means in the form of an endless feeder apron or conveyer generally indicated at 27. This conveyer preferably comprises a pair of transversely spaced endless, flexible elements in the form of chains 28 and 29 trained about the sprockets 25 and 26 on the shafts 23 and 24. An important feature of the invention lies in the constructional detail consisting of the conforming of the endless apron 27 to the shape of the bottom 13 of the body 10. As is best shown in Figures 1 and 2, the upper run of the apron 27 follows the contour of the floor sections 14, 15, and 16. For the purpose of accomplishing this result, there has been provided a first pair of transversely spaced sprockets 29ª and 30. The sprockets 29ª are located substantially at the junction of the floor sections 14 and 16, and the sprockets 30 are similarly located at the junction of the floor sections 14 and 15. The sprockets 30 are respectively journaled on stub shafts or pilots 31, and the sprockets 29ª are similarly journaled on stub shafts or pilots 32. The direction of travel of the apron 27 is indicated by the arrow in Figure 1.

Because of the nature of the contents of the spreader body 10, it is desirable to provide means for shielding certain portions of the apron. To this end, the side sheets 11 and 12 respectively carry shield means 33 and 34. Each shield is preferably formed of an inverted sheet-metal trough rigidly secured along its upper edge to the respective side sheet and extending downwardly and enclosing the sprockets 29 and 30 and also overlying portions of the chains 28 and 29, respectively. This construction prevents clogging of the apron mechanism by the contents of the spreader body.

As previously stated it is preferable to provide for the simultaneous discharge of both the liquid and solid manure from the body 10. For this purpose the rear of the body is provided with distributing or spreading mechanism, generally indicated by the numeral 50. Each of the side sheets 11 and 12 has rigidly secured thereto an extension plate 51, which extends upwardly to carry a transverse shaft 52 and rearwardly to carry a transverse shaft 53. The shaft 52 is journaled in the extension plates 51 and provides means for carrying an upper rotatable beater 54. This beater may be of any conventional construction and need not be illustrated or described in detail. The shaft 53 carries thereon a lower beater 55 which may likewise be of conventional construction. Each of the extension plates 51 may have secured thereto supporting means carrying a wide spread attachment generally indicated at 56. This attachment may be of any suitable form and is herein illustrated as a transverse spiral distributor or worm 57 suitably carried on a transverse shaft 58.

Drive means for all parts of the spreader is established by means of the rear drive wheels 21 and associated driving mechanism (not shown).

The construction of the apron 27 may be very similar to aprons or conveyers heretofore known, and accordingly the chains 28 and 29 of the apron illustrated here are cross-connected by a plurality of transverse load-engaging elements or slats 74. During rearward travel of the apron, these slats engage the combined liquid and solid fertilizer and move the same rearwardly toward the distributor means 50 and the wide spread attachment 56, very much in the usual manner.

The intermediate floor section 14 of the depending liquid-tight bottom 13 is provided with a suitable drain 75, by means of which remaining liquid fertilizer may be drained from the body 10. The bottom 13 is provided with guide means 76 engageable with the lower run of the conveyer 27 for the purpose of guiding the conveyer in its path around the bottom of the body.

The operation of the spreader is very similar to that of conventional spreaders and may be readily understood from the foregoing description of the spreader construction. According to the preferred form of the invention illustrated, both liquid and solid manure is loaded into the body 10. Since the intermediate portion of the bottom 13 is lower than the end portions, and particularly the discharge end portion, of the body, it will be seen that none of the liquid manure will leak out during transporting of the spreader to the field, and that the discharge of the liquid manure is confined to the discharge of the solid manure at the rear end of the machine. Conforming of the apron 27 to the shape of the bottom of the spreader provides for desirable and efficient feeding and discharge of both forms of manure simultaneously.

The liquid manure tends to separate by gravitation from the solid manure thus filling the intermediate depending floor section 14 with the liquid portion of the manure. Heretofore, this separation of the liquid from the solid portions of the manure was the final use of the liquid manure as it was allowed to leak from the distributor body, and no attempt was ever made to recombine it with the solid manure immediately previous to distributing such as is the purpose of the present invention. The solid substantially dehydrated portion of the manure is then carried by the angle irons 74 down through the body of liquid manure where it recombines by absorption. When the solid manure is carrying its maximum amount of liquid manure, it is caused to be distributed by the distributor end 50 of the machine.

Many means for performing the described method of treatment of manure preparatory to distributing as a fertilizer may be used, but it is not intended to limit the subject patent otherwise than as necessitated by the scope of the appended claims.

What is claimed is:

1. A method of handling fertilizer preliminary to spreading, comprising the steps of aggregating fertilizer containing liquids and solids, separating the liquids from the solids, and conveying the solid fertilizer through the liquid fertilizer for recombining by absorption of the liquids by the solids immediately previous to spreading.

2. A method of handling manure preliminary to spreading as a fertilizer, comprising the steps of aggregating manure containing liquids and solids, gravitationally separating the liquids from the solids, and conveying the solid manure through the separated liquid manure for recombining by absorption of the liquids by the solids immediately previous to the spreading.

WILLIAM GRIFFITHS.